United States Patent Office 2,730,436
Patented Jan. 10, 1956

2,730,436

STABILIZED ORGANIC COMPOSITIONS CONTAINING ARALKYLATED ALKOXY PHENOLS

David W. Young and Fred W. Banes, Westfield, N. J., assignors to Esso Research and Engineering Company, a corporation of Delaware No Drawing. Application January 8, 1952,
Serial No. 265,534

9 Claims. (Cl. 44—78)

This invention relates to the stabilization of organic compounds which tend to deteriorate in storage or in use due to undesirable oxidation reactions. In accordance with this invention, these organic compounds, and especially hydrocarbon type compounds, are stabilized against oxidation by incorporating therein small amounts of alkoxy phenols which have been further alkylated with aromatic compounds containing unsaturated side chains.

This application is a continuation-in-part of Serial No. 208,075 filed January 26, 1951, now abandoned.

Various organic compounds and mixtures, including mineral oils, resins, insecticides, soaps, lubricating oils, waxes, rubbers, polyolefins, such as polyisobutylene, etc., are adversely affected by oxygen with the resultant formation of undesirable oxidation products, breakdown products, gums and usually discoloration of the organic compounds, as well as other deleterious reaction products.

Thus, for example, in the oil refining industry, in order to prepare lubricating oils of superior quality, it is generally necessary to stabilize the oil against degradation which normally occurs due to oxidation of the hydrocarbon components. In general, hydrocarbon mixtures falling in the lubricating oil boiling range, if unstabilized, will over a period of time under certain conditions be subject to gum formation, sludge formation, the formation of acids and the formation of objectionable color bodies.

It is also known that synthetic rubbers undergo changes due to further polymerization or degradation due to depolymerization on exposure to air and consequently yield on vulcanization inferior products unless there is incorporated therewith at time of synthesis a compound which stabilizes the synthetic rubber by largely preventing oxidation, degradation and/or cyclization of the chain molecules present in the polymer structure. Natural, as well as synthetic, rubbers require an anti-oxidant present in the vulcanizate in order that finished rubber products remain stable toward oxidation and heat during their useful life.

Alkoxy phenols have been employed as stabilizers for unstable organic materials but many of these phenols suffer from the disadvantage of possessing only limited solubility in hydrocarbon materials and excessive solubility in water. This limited solubility in hydrocarbons necessitates the use of an expensive auxiliary solvent.

It has now been found that alkoxy phenols which have been further aralkylated, i. e., reacted with aromatic compounds containing unsaturated side chains, are extremely effective oxidation inhibitors and stabilizers for materials which usually degrade in the presence of air and/or heat. In addition, the compounds of this invention do not suffer from the above-listed disadvantages of the simple alkoxy phenols.

Those compounds, which are believed to be new chemicals, in which the alkoxy group has from 1 to 4 carbon atoms, e. g., the methoxy, ethoxy, propoxy and butoxy, and the aralkylating compound is styrene, alpha-methyl styrene, or alpha-methyl or p-methyl styrene, are especially effective.

The anti-oxidant products of this invention are solid or liquid in nature, depending upon the temperature at which they are held. Their structure is illustrated in Formula I below:

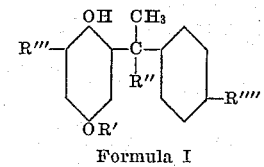

Formula I wherein R' is an alkyl radical having from 1 to 4 carbon atoms, R" is a radical selected from the group consisting of H and methyl radicals, R'" is a radical selected from the group consisting of H and

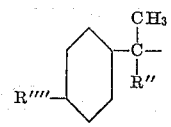

radicals and R"" is hydrogen or a methyl group.

The styrene-type substituent may occur once or twice in the molecule of the finished product depending upon the extent of alkylation. It is preferred to have two styrene-type groups linked to the alkoxy compound.

It should be noted that the alkoxy group occurs para to the hydroxyl group, which, in turn, is ortho to the styrene linkages. It is this particular configuration which is believed to impart the desired characteristics to the products of this invention. The compounds utilized for the anti-oxidant purposes of this invention are largely water-insoluble and oil-soluble, a desirable combination of characteristics.

The compounds of this invention can be prepared in general by aralkylating an alkoxy phenol in the presence of a solvent such as heptane, benzene, toluene, tetrachloroethane, kerosene, etc., with styrene or alpha-methyl styrene, etc., in the liquid phase at a temperature in the range of 30° to 80° C. Approximately equimolar concentrations of reactants are employed if a mono alkylated product is to be obtained and approximately a 2 to 1 molar ratio of styrene is employed if the preferable dialkylated product is to be made. An acid-type condensation catalyst such as sulfuric acid, $BF_3$, $BF_3$-ether catalyst complex, $BF_3$-phenol complex, $AlCl_3$, $AlBr_3$, $TiCl_4$ is employed in an amount of about 0.1 to 5 wt. percent. The solvent is then evaporated leaving the anti-oxidant product. The product is purified of residual catalyst by washing with aqueous bicarbonate or caustic solution. A preferred method is to percolate the reaction mixture through an adsorbing clay such as attapulgus clay.

The following examples are given to illustrate this invention and include both the preparation of products of this invention and test results on their use as anti-oxidants.

EXAMPLE I

One mol of 4-methoxy phenol was alkylated in heptane solution with one mol of styrene using $H_2SO_4$ catalyst at 50° C. to form 2-(alpha phenyl ethyl) 4-methoxy phenol. The amount of catalyst used was 2 weight per cent and the time interval of alkylation was between 2 to 4 hours. After the alkylation had taken place, the product was washed with water, sodium bicarbonate solution, water, and dried. The anti-oxidant had a boiling point of 145°–150° C. at 8 mm. Hg.

EXAMPLE II

In this example the evaluation test used was the ASTM Oxidation Stability Test designated as ASTM-D-525-46.

This test essentially consists of placing 50 cc. of the composition being tested in a bomb, after which oxygen is added to provide a pressure of about 100 lbs. p. s. i. g. This bomb is then heated to about 100° C. and the pressure in the bomb is determined at 15-minute intervals. When sufficient time has passed so that the pressure drops two pounds p. s. i. g. in 15 minutes, the test is discontinued and the time required to reach this condition is recorded at the induction period or the ASTM breakdown time and is ordinarily given in minutes. A material subjected to this test which is markedly unstable to oxidation will result in an ASTM breakdown time of about one hour, while an oxidation stable mixture will be characterized by breakdown times of 150 minutes or longer. Two pounds per 5,000 gallons of the compound prepared in Example I gave an ASTM breakdown time of 525 minutes in a cracked leaded premium gasoline. The control gave a breakdown of 135 minutes.

This example illustrates the marked improvement in anti-oxidant efficacy obtained by the compounds of this invention.

EXAMPLE III

The same ASTM test indicated in Example II was performed on other aralkylated alkoxy phenol compounds of this invention and other products. The results follow:

| Anti-oxidant | Breakdown Time in Minutes |
|---|---|
| None | 130 |
| Phenol | 150 |
| 4-Ethoxy phenol | 290 |
| 4-Butoxy phenol | 250 |
| 2,6 Di-t-butyl-4 methoxy phenol | 300 |
| 2-n-butyl-4-methoxy phenol | 280 |
| 2-Ethoxy-4-t-butyl phenol | 135 |
| 2-t-Butyl-4-ethoxy phenol | 240 |
| 4-Methoxy phenol alkylated with 1 mol of styrene | 585 |
| 4-Methoxy phenol alkylated with 2 mols of styrene | 440 |
| 4-Methoxy phenol alkylated with 1 mol of alpha-methyl styrene | 580 |
| 4-Methoxy phenol alkylated with 2 mols of alpha-methyl styrene | 410 |
| 4-Methoxy phenol alkylated with 1 mol of alpha-methyl-p-methyl styrene | 370 |
| 4-Methoxy phenol alkylated with 2 mols of alpha-methyl-p-methyl styrene | 400 |
| 4-Methoxy phenol alkylated with 1 mol of alpha-methyl styrene and 1 mol of alpha-methyl-p-methyl styrene | 385 |
| 4-Ethoxy phenol alkylated with 1 mol of styrene | 275 |
| 4-Ethoxy phenol alkylated with 2 mols of styrene | 285 |
| 4-Ethoxy phenol alkylated with 2 mols of alpha-methyl styrene | 280 |
| 2-Methoxy phenol alkylated with 1 mol of styrene | 160 |

Several points should be particularly noted from these data besides the excellent anti-oxidant effectiveness of the compounds of this invention. These compounds were at least as effective as the simple alkoxy phenols and in most cases much more effective. This is important because the compounds of this invention do not exhibit the undesirable water solubility and 10% $Na_2CO_3$ solubility of the simple alkoxy phenols. Water solubility results in the leaching of the simple alkoxy phenols from the gasoline when the latter comes in contact with water.

Another point to be noted is the criticality of the spatial configuration, i. e., that the alkoxy group in the compounds of this invention be in a para position with respect to the hydroxyl group. Thus the 4-methoxy phenol aralkylated with one mol of styrene exhibited an ASTM breakdown of 585, whereas the 2-methoxy phenol alkylated with one mol of styrene exhibited an ASTM breakdown of 160 or a decreased time of 73%.

In addition, these data bring out that the anti-oxidant efficacy of the compounds of this invention decreases with increasing chain length of the alkoxy group. This is completely surprising in view of the fact that the reverse phenomena occur with conventional anti-oxidants such as 2,6-di-t-butyl-4-methyl phenol, 2,6-di-t-butyl-4-ethyl phenol and 2,6-di-t-butyl-4-butyl phenol.

In addition, the compounds of this invention exhibit better activity than ordinary alkylated alkoxy phenols, e. g., the 4-methoxy phenol alkylated with 2 mols of styrene exhibited an ASTM value of 50% more than the same alkoxy phenol alkylated with 2 mols of isobutylene.

EXAMPLE IV

The compounds of this invention were tested for anti-oxidant efficacy by the Staeger Oxidation Test (H. Staeger Test—Chemisches Zentralblatt, part I, vol. 100, p. 594 (1929)) in mineral oil with 43 S. S. U. at 210° F. and V. I. of 112. The oil having no additive had a Staeger life of 90 hours. The oil containing 0.25 weight per cent 4-methoxy phenol alkylated with 2 mols of styrene had a Staeger life of 220 hours, or an approximate 150% improvement.

EXAMPLE V

The compounds of this invention were tested in a lime base grease for anti-oxidant activity. The Norma Hoffman Oxidation Test was used. This test comprises placing the grease in glass sample dishes in an oxidation bomb at 210° F. and 110 lbs. of initial oxygen pressure, using 20 gram samples of the grease. The pressure drop is measured periodically. The results were as follows:

| | 5 lb. Drop, Hrs. | 10 lb. Drop, Hrs. | 15 lb. Drop, Hrs. | 20 lb. Drop, Hrs. |
|---|---|---|---|---|
| Blank grease | 80 | 144 | 172 | 188 |
| Grease + 0.5% 4-methoxy phenol alkylated with one mol of styrene | 172 | 199 | 240 | 360 |

The results indicate how grease was stabilized by the products of this invention.

EXAMPLE VI

The compounds of this invention were tested for anti-oxidant effect on Paracril–26 (a butadiene-acrylonitrile synthetic rubber). The results follow:

Gel formation in Paracril–26 rubber at 140° F. for 14 days

[26% nitrile in copolymer]

| Percent Anti-oxidant | Name of Anti-oxidant | Percent Gel | Color of Rubber |
|---|---|---|---|
| 1 | 4-methoxy phenol alkylated with 1 mol of styrene. | 55 | Light Brown. |
| 0 | None | 89 | Black. |

The Paracril was clearly improved by the product of this invention.

EXAMPLE VII

The physical characteristics of various compounds of this invention were determined. These results are listed below:

| Compound | Boiling Point |
|---|---|
| 4-Methoxy phenol alkylated with 1 mol styrene. | 180° C. at 4 mm. Hg. |
| 4-Methoxy phenol alkylated with 2 mols styrene, product known as 2,6-diphenyl ethyl-4-methoxy phenol. | 200°–201° C. at 3 mm. Hg. |
| 4-Methoxy phenol alkylated with 1 mol alpha-methyl styrene. | 185° C. at 4 mm. Hg. |
| 4-Methoxy phenol alkylated with 2 mols of alpha-methyl styrene. | 208° C. at 3 mm. Hg. |

It is to be seen from the above examples that the compounds of this invention provide markedly effective oxidation inhibition. As a result of these tests, it is contemplated in accordance with this invention that the class of inhibitors indicated may be used to stabilize oxidation unstable mixtures. The indicated alkylated alkoxy phenols are particularly adapted for use with cracked gasolines, synthetic ester lubes, mineral oils, greases formed from metallic stearate and esters, rubbers, and wax polymer blends.

It is also proposed that the aralkylated alkoxy phenol anti-oxidants of this invention be employed to stabilize organic compounds such as mineral oils, synthetic ester lubricating oils, lubricating oils and particularly that they should be used to stabilize the class of oils known as turbine oils. Turbine oils are highly refined lubricating oils, having a range in Saybolt viscosity at 210° F. from about 43 to 145, to which are added suitable anti-oxidants, rust preventers, pour depressants, V. I. improvers, metallic soaps and other additives.

The synthetic rubbers which may be stabilized in accordance with this invention in addition to GR–I (isobutylene-diolefin polymer) rubber are the polymers consisting predominantly of a polymerizable conjugated diolefin having four to six carbon atoms, e. g., 1,3-butadiene, isoprene, 2,3-dimethylbutadiene, 2-chlorobutadiene-1,3, piperylene, 2-methylpentadiene-1,3, and the like; hence, synthetic rubbers of the above class include polymers of these materials and also copolymers prepared by the polymerization of monomer mixtures comprising a major proportion of such a polymerizable diolefin and also containing a minor proportion of other monoethylenically unsaturated compounds copolymerizable with the diolefin such as methyl acrylonitrile, methyl methacrylate, styrene, alpha-methyl styrene, vinyl naphthalene, vinyl ketones, vinylidene chloride, diethyl fumarate, vinyl pyridine, and the like. Natural vulcanized rubber is also stabilized by the compounds of this invention.

The incorporation of the aralkylated alkoxy phenols with the synthetic rubber may be carried out simply by adding the compounds either in the pure form or in solution, suspension or emulsion to the solid synthetic rubber in a water dispersion, or during the milling operation, or to a latex containing the synthetic rubber dispersed in an aqueous medium such as is ordinarily obtained by an emulsion polymerization process.

The amount of the indicated ingredients added to the normally oxidizable material in order to prevent oxidation varies with different materials.

In general, the amount that has to be added to the normally oxidizable material represents only a small proportion of the normally oxidizable substance, i. e., 0.0003–5 weight per cent based on the normally oxidizable material.

Typical formulations are as follows with the weight per cent figure based on the normally oxidizable substance:

Gasoline—0.1 to 5 lbs. present per 5,000 gal. of gasoline (approximately .0003–0.15 wt. per cent).
Lubricating oils—0.02 to 10% by weight.
Rubbers and plastics—0.1 to 5% by weight.

The compounds of this invention may be utilized in mixtures or in conjunction with other anti-oxidants in order to obtain desirable combinations of properties. Among the other anti-oxidant materials which may be so employed are phenyl-beta-naphthylamine, naphthols, substituted naphthols, substituted phenols, substituted catechols, substituted hydroquinones, alkyl phenol sulfides, ketone-amine condensation products, aralkylated and alicyclic substituted phenols, and the like. Due to the fact that the aralkylated alkoxy phenols have good color, they may be mixed with 2,6-ditertiary-butyl-4-methyl phenol in rubber or resin compounds to form light colored stocks.

The anti-oxidant compounds of this invention have many advantages, among which are their extreme potency, ease of preparation, good color retention, non-staining and odorless character and volatility.

The formula presented above in Formula I represents what is believed to be the correct structure of the compounds synthesized, i. e., the compounds produced during the course of the synthesis in the much greater proportion and those to which the anti-oxidant activity is believed to be attributable. It is possible, however, that minor amounts or traces of isomeric compounds are also produced. These compounds also contain the particular configuration referred to above, which is believed to impart the desired characteristics to the product of this invention.

It is to be understood that the invention is not limited to the specific examples which have been offered merely as illustrations, since other derivatives can be prepared, and that modifications may be made without departing from the spirit of the invention.

What is claimed is:

1. A composition of matter comprising an organic hydrocarbon material normally subject to oxidative changes containing as an anti-oxidant 0.0003 to about 5% by weight of an aralkylated alkoxy phenol corresponding to the general formula

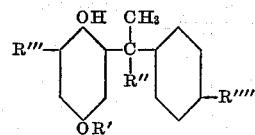

wherein R' is an alkyl radical having from 1 to 4 carbon atoms, R'' is a radical selected from the group consisting of hydrogen and methyl radicals, R''' is a radical selected from the group consisting of hydrogen and

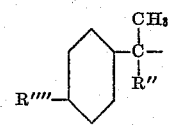

radicals and R'''' is a radical selected from the group consisting of hydrogen and methyl radicals.

2. A composition as in claim 1 in which R'', R''' and R'''' are hydrogen.

3. A composition as in claim 1 in which R' is a methyl radical, R'' and R'''' are hydrogen and R''' is the alpha phenyl ethyl radical.

4. A composition as in claim 1 in which R' and R'' are methyl radicals, R''' is the alpha methyl alpha phenyl ethyl radical and R'''' is hydrogen.

5. A cracked gasoline containing as an inhibitor against oxidative deterioration an aralkylated alkoxy phenol corresponding to the general formula

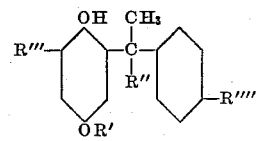

wherein R' is an alkyl radical having from 1 to 4 carbon atoms, R'' is a radical selected from the group consisting of hydrogen and methyl radicals, R''' is a radical selected from the group consisting of hydrogen and

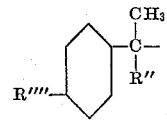

radicals and R'''' is a radical selected from the group consisting of hydrogen and methyl radicals, said alkoxy phenol being present in an amount corresponding to approximately 0.01 to 5 pounds per 5,000 gallons of gasoline.

6. A composition as in claim 5 in which R'' and R''' are hydrogen.

7. A composition as in claim 5 in which R' is a methyl radical, R'' and R'''' are hydrogen and R''' is the alpha phenyl ethyl radical.

8. A composition as in claim 5 in which R' and R'' are methyl radicals, R''' is the alpha methyl alpha phenyl ethyl radical and R'''' is hydrogen.

9. A composition of matter comprising an organic material normally subject to oxidative changes containing as an anti-oxidant from about 0.0003 to about 5 wt. per cent of an aralkylated alkoxy phenol corresponding to the general formula

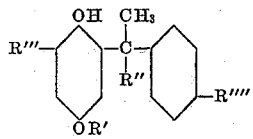

wherein R' is an alkyl radical having from 1 to 4 carbon atoms, R'' is a radical selected from the group consisting of hydrogen and methyl radicals, R''' is a radical selected from the group consisting of hydrogen and

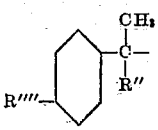

radicals and R'''' is a radical selected from the group consisting of hydrogen and methyl radicals.

References Cited in the file of this patent

UNITED STATES PATENTS

| | | |
|---|---|---|
| 2,285,625 | Taylor et al. | June 9, 1942 |
| 2,326,702 | Taylor et al. | Aug. 10, 1943 |
| 2,591,651 | Young | Apr. 1, 1952 |

FOREIGN PATENTS

| | | |
|---|---|---|
| 523,696 | Germany | May 4, 1931 |

OTHER REFERENCES

Dodds et al.: Nature, page 996, June 13, 1936. (Copy in Sci. Lib.)